W. A. KELLOGG.
END CLOSURE FOR PIPES.
APPLICATION FILED APR. 20, 1916.

1,201,312.

Patented Oct. 17, 1916.

Inventor
Willis Arthur Kellogg

Witnesses
R. M. McCormick
A. L. Phelps

By
C. C. Shepherd Attorney

UNITED STATES PATENT OFFICE.

WILLIS ARTHUR KELLOGG, OF COLUMBUS, OHIO.

END-CLOSURE FOR PIPES.

1,201,312.      Specification of Letters Patent.      Patented Oct. 17, 1916.

Application filed April 20, 1916. Serial No. 92,342.

*To all whom it may concern:*

Be it known that I, WILLIS ARTHUR KELLOGG, a citizen of the United States, residing at Columbus, in the county of Franklin and State of Ohio, have invented certain new and useful Improvements in End-Closures for Pipes, of which the following is a specification.

This invention relates to end closures for pipes and particularly high pressure pipes used as water or gas mains.

When a new system or line of pipe is constructed, it is customary to test the same before allowing the fluid to enter it permanently, this for the purpose of locating any leaks should they exist.

My invention has for its main object, the provision of a closure for use as described above which is very ready of application and which may also be very readily removed after the test has been completed, so that it may be again used in a different locality. By this arrangement, the same closure may be used over and over again.

Figure 1:
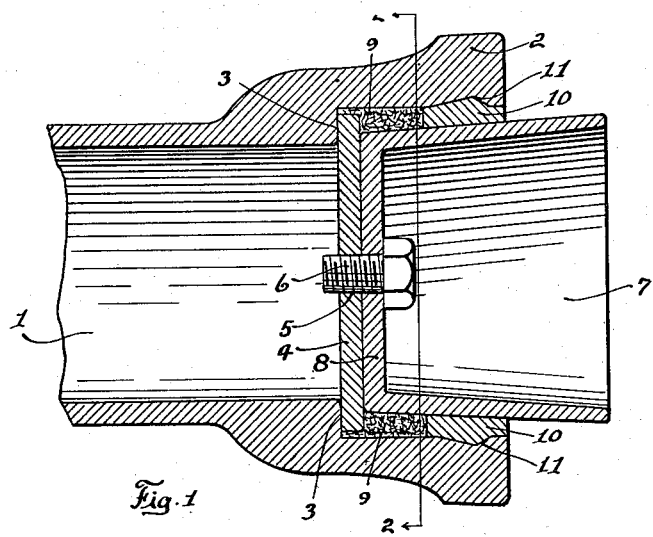
Figure 2:
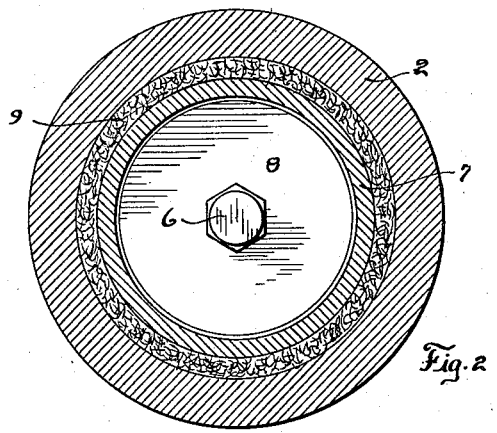

The preferred embodiment of my invention is shown in the accompanying sheet of drawings, in which similar characters of reference designate corresponding parts, and in which:

Figure 1 is a vertical section taken through the bell end of a pipe showing my improved type of closure applied thereto, and, Fig. 2 is a section taken on line 2—2 of Fig. 1.

In these several views, the pipe or main is designated by the reference numeral 1 and is shown as being provided at one end with a bell 2. This bell and pipe are of the usual construction and are provided with a shoulder as is shown at 3, forming an abutment against which a disk 4 is designed to rest. This disk is provided with a centrally arranged threaded aperture 5 for receiving the threaded shank of a bolt 6. This bolt is designed to secure the disk to a cup-shaped element 7, which cup shaped-element has a tubular slightly tapering body portion as is shown and is also provided at its smaller end with a centrally apertured closure 8. The aperture in the closed end 8 of this cup-shaped element and the threaded aperture 5 in the disk are designed to register so that the hollowed portion of the bell 2 will be concentric with the disk and the cup-shaped element after the manner illustrated in the drawings. When the disk and cup-shaped element are thus united, they are placed in the bell end of the pipe and the joint between the end of the pipe and the cup-shaped element is sealed by any desirable type of packing 9 such as jute etc., which is securely hammered or pounded into position. After a sufficient quantity of packing has been thus applied, a more permanent packing is employed such as lead, which is shown at 10, it being customary to apply this lead in its molten condition so that after it sets, it maintains a permanent form. It will be noted that the extreme rear end portion of the bell of the pipe is provided with an annular groove arrangement such as shown at 11 to form a stop to prevent the removal of the lead gasket or packing in its entirety. Also, by means of this groove, it is impossible to remove the entire closure without first removing the lead packing.

From the foregoing, it will be apparent that I have provided a type of end closure which is easily applied and which may be used over and over again. Its removal is effected by the detachment of the cup-shaped element from the disk 4 by removal of the bolt 5. Because of the tapered end of this cup-shaped element, it may be easily removed after it is detached from the disk. After its removal, the removal of the lead gasket or packing is a comparatively simple matter and after this removal, the disk may likewise be removed.

What I claim, is:

1. In combination with the bell end of a pipe, an end closure therefor comprising a disk to fit into said bell end, a cup shaped element smaller in diameter than the interior of the bell end, the bottom wall of said element being of substantially the contour as the face of said disk which it abuts, means within the interior of said element for directly connecting the bottom of said element to said disk, and a fluid-tight packing interposed between said cup-shaped element and said bell end.

2. In combination with the bell end of a pipe, an end closure therefor comprising a flat faced disk to fit into said bell end, said disk being apertured and threaded for an attaching bolt, a cup-shaped element smaller in diameter than the interior of the bell end, the bottom wall of said element being flat to correspond with the face of said disk and being correspondingly apertured, a bolt passing through said apertures, the head of which engages the inside face of the bottom wall of said element, and a flat tight packing interposed between said cup element and said bell end.

In testimony whereof I affix my signature in presence of two witnesses.

WILLIS ARTHUR KELLOGG.

Witnesses:
WALTER E. L. BOCK,
A. L. PHELPS.